(12) United States Patent
Yonezawa et al.

(10) Patent No.: US 12,089,112 B2
(45) Date of Patent: Sep. 10, 2024

(54) ELECTRONIC APPARATUS, METHOD, AND ELECTRONIC SYSTEM

(71) Applicants: KABUSHIKI KAISHA TOSHIBA, Tokyo (JP); Toshiba Energy Systems & Solutions Corporation, Kawasaki (JP)

(72) Inventors: Yuki Yonezawa, Ayase Kanagawa (JP); Takafumi Sakamoto, Machida Tokyo (JP); Tomohiro Tobari, Yokohama Kanagawa (JP); Takanori Kouta, Hachioji Tokyo (JP)

(73) Assignees: KABUSHIKI KAISHA TOSHIBA, Tokyo (JP); TOSHIBA ENERGY SYSTEMS & SOLUTIONS CORPORATION, Kanagawa (JP)

( * ) Notice: Subject to any disclaimer, the term of this patent is extended or adjusted under 35 U.S.C. 154(b) by 355 days.

(21) Appl. No.: 17/469,719

(22) Filed: Sep. 8, 2021

(65) Prior Publication Data
US 2021/0409908 A1  Dec. 30, 2021

Related U.S. Application Data

(63) Continuation of application No. PCT/JP2020/011766, filed on Mar. 17, 2020.

(51) Int. Cl.
*H04W 4/02* (2018.01)
*G01S 5/02* (2010.01)
*H04W 4/029* (2018.01)

(52) U.S. Cl.
CPC .......... *H04W 4/029* (2018.02); *G01S 5/0278* (2013.01)

(58) Field of Classification Search
CPC .......... H04W 4/02; H04W 4/029; G01S 5/02; G01S 5/0278
See application file for complete search history.

(56) References Cited

U.S. PATENT DOCUMENTS 7,720,026 B2   5/2010   Chen et al.
9,143,954 B2   9/2015   Hibara et al.
(Continued)

FOREIGN PATENT DOCUMENTS

JP   2008178006 A   7/2008
JP   2008298721 A   12/2008
(Continued)

OTHER PUBLICATIONS

International Search Report (ISR) dated Jun. 9, 2020 issued in International Application No. PCT/JP2020/011766.
(Continued)

*Primary Examiner* — Jinsong Hu
*Assistant Examiner* — Farideh Madani
(74) *Attorney, Agent, or Firm* — Holtz, Holtz & Volek PC

(57) ABSTRACT

According to one embodiment, an electronic apparatus includes: processing circuitry configured to generate information regarding distances among a plurality of candidate positions of a plurality of wireless devices based on first information indicating the plurality of candidate positions, and determine a first candidate position from the plurality of candidate positions based on the information regarding the distances among the plurality of candidate positions to acquire identification information of a wireless device which is located on the first candidate position among the plurality of wireless devices.

12 Claims, 11 Drawing Sheets

(56) References Cited

U.S. PATENT DOCUMENTS

| | | | |
|---|---|---|---|
| 9,571,214 | B2 | 2/2017 | Tohzaka et al. |
| 9,706,515 | B1* | 7/2017 | Chadwick ............... H04W 8/20 |
| 9,980,085 | B2 | 5/2018 | Yonezawa et al. |
| 10,182,306 | B2 | 1/2019 | Kanayama et al. |
| 10,359,503 | B2 | 7/2019 | Igura |
| 10,587,987 | B2 | 3/2020 | Thoresen et al. |
| 10,677,883 | B2 | 6/2020 | Patel et al. |
| 2013/0260781 | A1* | 10/2013 | Un ........................ H04W 64/00 455/456.1 |
| 2017/0041740 | A1* | 2/2017 | Kanayama ........... H04B 17/318 |
| 2018/0279078 | A1 | 9/2018 | Yonezawa et al. |
| 2020/0084574 | A1 | 3/2020 | Kwon et al. |
| 2020/0198581 | A1* | 6/2020 | Ette ......................... B60R 25/31 |
| 2021/0190927 | A1 | 6/2021 | Sakamoto et al. |
| 2021/0194423 | A1 | 6/2021 | Yonezawa et al. |

FOREIGN PATENT DOCUMENTS

| | | | |
|---|---|---|---|
| JP | 2010190629 | A | 9/2010 |
| JP | 2012004726 | A | 1/2012 |
| JP | 2012124936 | A | 6/2012 |
| JP | 5266976 | B2 | 5/2013 |
| JP | 2013246118 | A | 12/2013 |
| JP | 2014016291 | A | 1/2014 |
| JP | 5564063 | B2 | 6/2014 |
| JP | 2017032469 | A | 2/2017 |
| JP | 2017227600 | A | 12/2017 |
| JP | 2018155674 | A | 10/2018 |
| JP | 2018189639 | A | 11/2018 |
| JP | 6517623 | B2 | 5/2019 |
| JP | 2020038112 | A | 3/2020 |
| JP | 2020094837 | A | 6/2020 |
| WO | 2012104983 | A1 | 8/2012 |
| WO | 2016125489 | A1 | 8/2016 |

OTHER PUBLICATIONS

Yonezawa, et al., "Technique to Swiftly Obtain Information on Luminaire Locations after Introduction of Wireless Lighting Control Systems", Toshiba Review, vol. 74, No. 3, pp. 44-47, published May 23, 2019.

International Search Report (ISR) dated Jun. 2, 2020 issued in International Application No. PCT/JP2020/008944.

Related U.S. Appl. No. 17/468,145; First Named Inventor: Takafumi Sakamoto; Title: "Electronic Apparatus, Method, Non-Transitory Computer Readable Medium, and Electronic System"; Filed: Sep. 7, 2021.

Related U.S. Appl. No. 17/469,719; First Named Inventor: Yuki Yonezawa; Title: "Electronic Apparatus, Method, and Electronic System"; Filed: Sep. 8, 2021.

1 Office Action (Non-Final Rejection) dated Nov. 29, 2023, issued in related U.S. Appl. No. 17/468,145.

Kajita, et al., "Examination of the Automatic Identification Technique of Air-Conditioning Apparatus Based on BLE Electric Wave Positioning", Multimedia, Distributed, Cooperative and Mobile (DICOMO2018) Symposium, 2018 Information Processing Society of Japan, pp. 828-836, Jul. 4, 2018.

* cited by examiner

| | P1 | P2 | P3 | P4 | P5 | P6 | P7 | P8 | P9 | P10 | P11 | P12 | P13 | P14 | P15 |
|---|---|---|---|---|---|---|---|---|---|---|---|---|---|---|---|
| EVALUATION INDEX A | D1 | D2 | D3 | D4 | D5 | D6 | D7 | D8 | D9 | D10 | D11 | D12 | D13 | D14 | D15 |
| EVALUATION INDEX B | D1 | D2 | D3 | D4 | D5 | D6 | D7 | D8 | D9 | D10 | D11 | D12 | D14 | D13 | D15 |
| EVALUATION INDEX C | D2 | D1 | D3 | D4 | D5 | D6 | D7 | D8 | D9 | D10 | D11 | D12 | D13 | D14 | D15 |

FIG. 14

ELECTRONIC APPARATUS, METHOD, AND ELECTRONIC SYSTEM

CROSS REFERENCE TO RELATED APPLICATIONS

This application is a Continuation of International Application No. PCT/JP2020/011766, filed on Mar. 17, 2020, the entire contents of which are incorporated herein by reference.

FIELD

Embodiments described herein relate to an electronic device, a method, and an electronic system.

BACKGROUND

A method of estimating positions where wireless devices are located by measuring propagation characteristics (for example, an RSSI) of electromagnetic waves among the plurality of wireless devices is known. For the method, it is desired to improve accuracy of estimating the positions where the wireless devices are located.

BRIEF DESCRIPTION OF THE DRAWINGS

FIG. 14 is a diagram describing the positions of the respective wireless devices 200 estimated for each evaluation index in the second embodiment.

DETAILED DESCRIPTION

Figure 1:
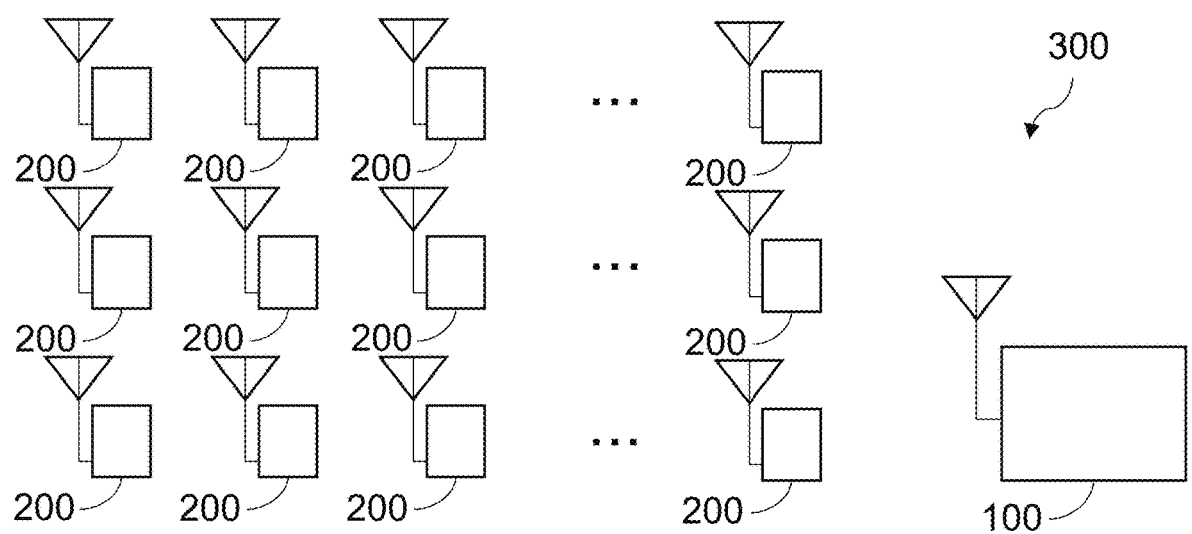
FIG. 1 is a diagram describing a communication system 300.

According to one embodiment, an electronic apparatus includes: processing circuitry configured to generate information regarding distances among a plurality of candidate positions of a plurality of wireless devices based on first information indicating the plurality of candidate positions, and determine a first candidate position from the plurality of candidate positions based on the information regarding the distances among the plurality of candidate positions to acquire identification information of a wireless device which is located on the first candidate position among the plurality of wireless devices.

Hereinafter, embodiments for implementing the invention will be described with reference to the drawings. The disclosure is merely an example, and the invention is not limited by contents described in the embodiments below. Modifications that can be easily conceived by those skilled in the art are naturally included in the scope of the disclosure. In order to make description clearer, in the drawings, a size, a shape and the like of each portion may be changed with respect to the actual embodiments and schematically illustrated. In the plurality of drawings, same reference numbers are attached to corresponding elements and detailed description may be omitted.

First Embodiment

The first embodiment will be described. FIG. 1 illustrates a communication system 300 (an electronic system) relating to the first embodiment. The communication system 300 includes an estimation apparatus 100 and a plurality of wireless devices 200. The estimation apparatus 100 is a device which acquires information indicating candidates (hereinafter, also referred to as candidate positions) of a plurality of positions where the wireless devices 200 are located and information (hereinafter, also referred to as communication information) regarding communication among the wireless devices 200, and estimates at which candidate positions the respective wireless devices 200 are located. As an application example, in a case where the wireless devices 200 are provided in apparatuses such as a lighting fixture, an air conditioner or a solar battery module, the estimation apparatus 100 can estimate the positions of the apparatuses provided with the wireless devices 200 by estimating the positions of the wireless devices 200. The estimation apparatus 100 and the wireless devices 200 can communicate between the estimation apparatus 100 and the wireless device 200 and can also communicate among the plurality of wireless devices 200. The communication includes at least one of exchange required for the communication and transmission and reception of signals. FIG. 1 illustrates the case where the communication is wirelessly performed, however, the communication may be performed at least partially by wire. For a wireless communication standard, an arbitrary standard such as Wi-Fi®, Bluetooth® or UWB (Ultra Wide Band) is applicable.

First, the estimation apparatus 100 determines a candidate positions A to acquire identification information of the located wireless devices 200. The candidate positions A are the candidate positions where a possibility that estimation of the located wireless devices 200 becomes erroneous is high compared to the other candidate positions. The estimation apparatus 100 then estimates the positions where the wireless devices 200 other than the wireless devices 200A are located from the candidate positions based on the identification information of the wireless devices 200A located on the candidate positions A. Thus, estimation accuracy of the positions of the wireless devices 200 can be improved.

Figure 2:
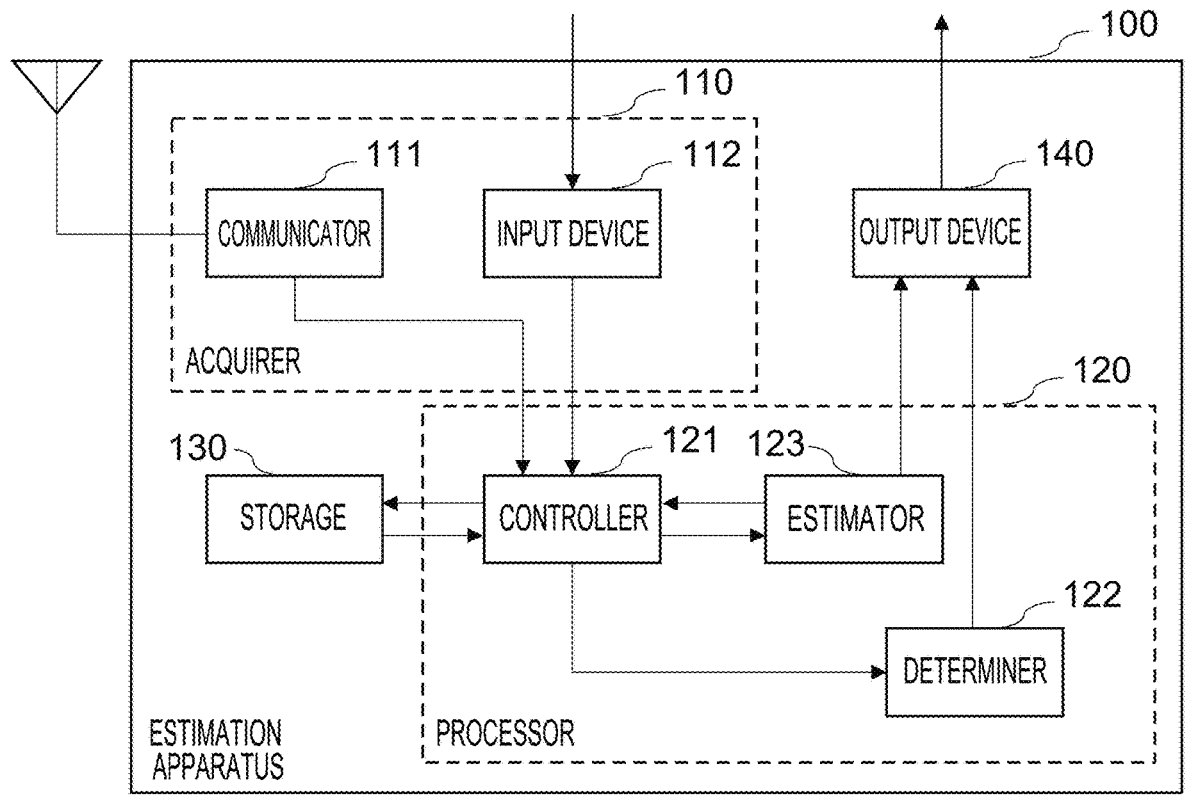
FIG. 2 is a block diagram of an estimation apparatus 100.

FIG. 2 is a block diagram of the estimation apparatus 100 (an electronic apparatus). A configuration of the estimation apparatus 100 will be described using FIG. 2. The estimation apparatus 100 includes an acquirer (acquisition circuitry) 110, a processor (processing circuitry) 120, a storage 130, and an output device (output circuitry) 140. The acquirer 110 includes a communicator 111 and an input device 112, and the processor 120 includes a controller 121, a determiner 122, and an estimator 123.

The communicator 111 includes an antenna, and transmits and receives wireless signals by communication. For example, the communication can be performed with the wireless devices 200 and a database or the like. The communicator 111 receives and acquires the communication information from the wireless devices 200. The communication information includes propagation information such as an RSSI (Received Signal Strength Indicator) or a PER (Packet Error Rate) in the communication among the plurality of wireless devices 200, the identification information of the wireless devices 200 in the communication among the plurality of wireless devices 200, and information indicating the reception time of signals and a channel number used for the communication or the like, for example. The identification information is the information which specifies each wireless device 200, and the estimation apparatus 100 can individually specify each wireless device 200 included in the communication system 300 by the identification information. The identification information is an apparatus ID, a MAC address or an IP address for example, but arbitrary information is applicable as long as each wireless device 200 can be individually specified. The communicator 111 may acquire the communication information through the communication of the database or the like. The communication information is used for estimating the positions where the wireless devices 200 are located.

The input device 112 acquires the information indicating the candidate positions and the identification information of the wireless devices 200A located on the candidate positions A. For example, the input device 112 may acquire the information indicating the candidate positions by input from a user, may input or scan a drawing describing the positions where the wireless devices 200 are located or the like and acquire the information indicating the candidate positions by image processing or the like, or may photograph or input an image indicating a location situation of the wireless devices 200 and acquire the information indicating the candidate positions by the image processing or the like. In addition, the identification information of the wireless devices 200A acquired by the input device 112 becomes known information in the estimation of the positions of the wireless devices 200. The identification information of the wireless devices 200A may be inputted by the user, or may be transmitted by signals and acquired by the communicator 111.

In addition, in the input device 112, after the estimation apparatus 100 estimates and outputs the positions of the wireless devices 200, a response to the positions of the wireless devices 200 is acquired. The response indicates that the estimated positions of the wireless devices 200 are correct or at least partially corrected positions among the estimated positions of the wireless devices 200 or the like. The response may be inputted by the user, or may be transmitted by signals. By the response, the estimation apparatus 100 can determine the positions of the wireless devices 200.

The controller 121 makes the storage 130 hold the information indicating the candidate positions, the communication information, and the identification information of the wireless devices 200A sent from the acquirer 110, and sends at least one piece of the information among the information held in the storage 130 to the determiner 122 and the estimator 123. In addition, the controller 121 determines the positions of the wireless devices 200 based on the estimated positions of the wireless devices 200 and the response (hereinafter, the information indicating at which candidate positions the wireless devices 200 are located is also referred to as determined information). The controller 121 makes the storage 130 hold the determined information.

The determiner 122 determines the candidate positions A to acquire the identification information of the located wireless devices 200 based on the information indicating the candidate positions, which is sent from the controller 121. In determination of the candidate positions A, the determiner 122 first generates information regarding distances among the candidate positions. The information regarding the distances among the candidate positions may be the information of the distances among the candidate positions themselves or may be information of evaluation values for which the distances among the candidate positions are evaluated. Then, the determiner 122 determines the candidate positions A to acquire the identification information of the located wireless devices 200 from the candidate positions based on the generated information regarding the distances among the candidate positions. The determiner 122 sends the information of the determined candidate positions A to the output device 140.

The estimator 123 estimates the positions where the wireless devices 200 are located from the candidate positions based on the information indicating the candidate positions, the communication information and the identification information of the wireless devices 200A, which are sent from the controller 121. Since the wireless devices 200A are known to be located on the candidate positions A, the estimator 123 may estimate the positions of the wireless devices 200 other than the wireless devices 200A from the candidate positions other than the candidate positions A. The estimator 123 sends the information of the estimated positions of the wireless devices 200 to the output device 140. The information of the estimated positions of the wireless devices 200 may include the information of the positions of the wireless devices 200A.

In FIG. 2, the controller 121, the determiner 122 and the estimator 123 are included in the processor 120. The processor 120 is one or more electronic circuits including a control device and an arithmetic operation device. The electronic circuits are achieved by an analog or digital circuit or the like. For example, a general purpose processor, a central processing unit (CPU), a microprocessor, a digital signal processor (DSP), an ASIC, an FPGA and the combination thereof are possible. In addition, the processor 120 may be executed in the electronic circuits by software.

The storage 130 holds the information sent from the controller 121. The storage 130 is a memory or the like, and is a RAM (Random Access Memory), a PROM (Programmable ROM), an EPROM (Erasable PROM), an EEPROM (Electrically EPROM), a flash memory or a register or the like. In addition, the storage 130 may be provided on the outside other than the inside of the estimation apparatus 100. When provided on the outside, the storage 130 may be a cloud which holds the information via the Internet.

The output device 140 outputs the information of the candidate positions A sent from the determiner 122 and information indicating an instruction to send the identification information of the wireless devices 200A at the candidate positions A to the acquirer 110. By the output, the acquirer 110 acquires the identification information of the wireless devices 200A. An output destination and form of the information of the candidate positions A are arbitrary, and are, for example, a device which visually displays a message urging the user to input the identification information of the wireless devices 200A, or an information processor.

The output device 140 outputs the information indicating the estimated positions of the wireless devices 200, which is sent from the estimator 123. The output destination and form of the information of the candidate positions A and the information indicating the estimated positions of the wireless devices 200 are arbitrary, and are, for example, a device which analyzes, a device which visually displays and a device which holds the information indicating the estimated positions of the wireless devices 200.

The device of the output destination to which the output device 140 outputs the information may be a non-illustrated element inside the estimation apparatus 100, or may be provided outside the estimation apparatus 100. In addition, the output device 140 may include a part of the communicator 111 and output the information of the candidate positions A and the information indicating the positions of the wireless devices 200 by communication.

Note that, in FIG. 2, the acquirer 110 includes the communicator 111 and the input device 112, however, the acquirer 110 may include at least one of them or may include a new device which acquires information or signals. In the present embodiment, as one example, the communicator 111 acquires the communication information, and the input device 112 acquires the information indicating the candidate positions, the identification information of the wireless devices 200A and the response. As long as the acquirer 110 can acquire the information indicating the candidate positions, the communication information, the identification information of the wireless devices 200A and the response, an arbitrary acquisition method is applicable. For example, the communicator 111 may receive and acquire at least one of the information indicating the candidate positions, the identification information of the wireless devices 200A and the response, and the input device 112 may acquire the communication information. The information indicating the candidate positions, the communication information and the identification information of the wireless devices 200A acquired by the acquirer 110 are sent to the controller 121.

Figure 3:
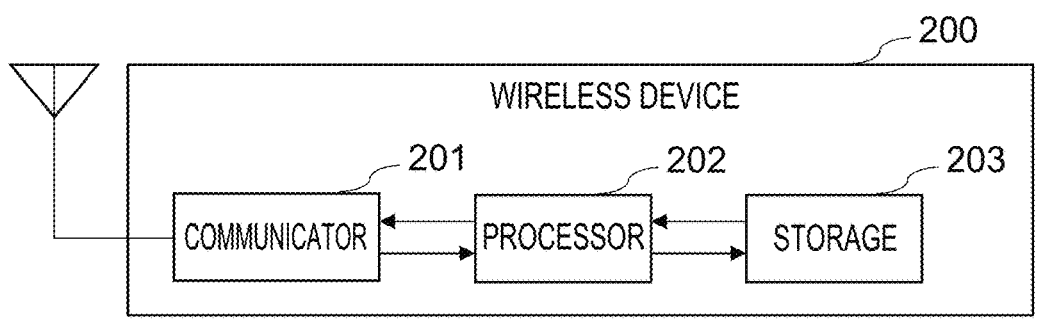
FIG. 3 is a block diagram of a wireless device 200.

The configuration of the estimation apparatus 100 has been described above. At least some of components of the estimation apparatus 100 may be mounted on a physically integrated semiconductor integrated circuit (LSI or the like). FIG. 3 is a block diagram of the wireless device 200. In the communication system 300, the plurality of wireless devices 200 are assumed, and each of them has the configuration similar to FIG. 3. The wireless device 200 includes a communicator 201, a processor 202 and a storage 203.

The communicator 201 includes an antenna, and transmits and receives wireless signals by communication. For example, the communication can be performed with the other wireless devices 200 (for example, wireless devices 200B) and the estimation apparatus 100. The communicator 201 sends the communication information to the estimation apparatus 100 and also transmits the signals to the wireless devices 200B. A transmission scheme is arbitrary, and broadcast is used for example. Thus, the propagation information is measured in the wireless devices 200B, and the communication information is generated. The communicator 201 receives the signals from the wireless devices 200B and sends them to the processor 202. The signals are used for measuring the propagation information.

The processor 202 measures the propagation information between the wireless devices 200 and 200B based on the signals sent from the wireless devices 200B. The processor 202 generates the communication information based on the measured propagation information. The processor 202 makes the storage 203 hold the propagation information and/or the communication information, and acquires at least one piece of the information held in the storage 203 and sends it to the communicator 201 as the communication information. The processor 202 may generate the communication information by gathering the propagation information between the plurality of wireless devices 200B (200B1, 200B2 . . . ) and the wireless devices 200, or may generate the communication information for each propagation information with each wireless device 200B. The processor 202 is configured by at least one of the electronic circuits described for the processor 120.

The storage 203 holds the information sent from the processor 202. The storage 203 is configured by at least one of the memory and the like described for the storage 130. The configuration of the wireless device 200 has been described above. At least some of the components of the wireless device 200 may be mounted on the physically integrated semiconductor integrated circuit (LSI or the like).

Hereinafter, an operation of the estimation apparatus 100 will be described. In the present embodiment, as one example, the operation of the case where the estimation apparatus 100 estimates the positions of the respective wireless devices 200 will be described. Note that it is assumed that the wireless devices 200 of the communication system 300 have already measured the propagation information among the wireless devices 200. The estimation apparatus 100 acquires the information indicating the plurality of candidate positions where the wireless devices 200 are located and the communication information including the propagation information among the wireless devices 200. The estimation apparatus 100 generates the information regarding the distances among the plurality of candidate positions, and determines the candidate positions A to acquire the identification information of the located wireless devices 200. The estimation apparatus 100 outputs the instruction to input or send the candidate positions A and the identification information of the wireless devices 200A located on the candidate positions A. The estimation apparatus 100 acquires the identification information of the wireless devices 200A inputted or sent according to the instruction. The estimation apparatus 100 estimates the positions of the respective wireless devices 200 from the candidate positions included in the information indicating the candidate positions, based on the information indicating the candidate positions, the identification information of the wireless devices 200A and the communication information. The estimation apparatus 100 outputs the information indicating the estimated positions of the respective wireless devices 200, and acquires the response to the estimated positions of the respective wireless devices 200. The estimation apparatus 100 corrects the positions of the respective wireless devices 200 according to the acquired response, and determines the positions of the wireless devices 200. Note that the estimation apparatus 100 specifies the respective wireless devices 200 based on the identification information included in the communication information.

Figure 4:
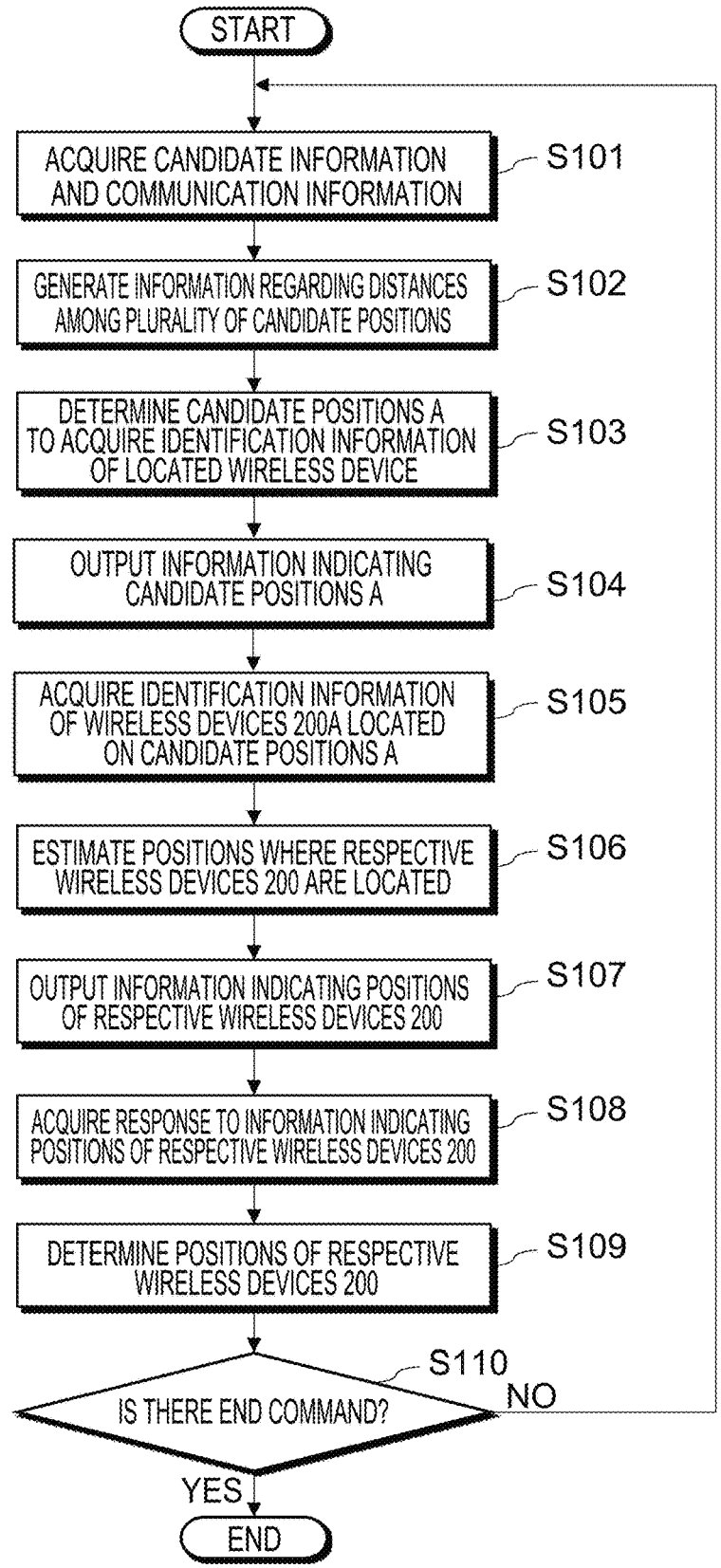
FIG. 4 is a flowchart of an operation of the estimation apparatus 100 in a first embodiment.
Figure 5:
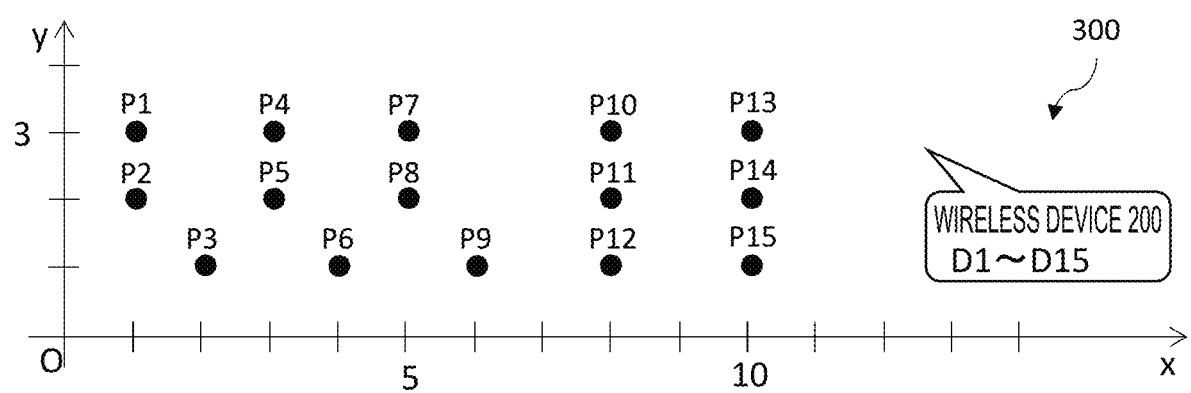
FIG. 5 is a diagram describing positions (coordinates) of candidate positions P1-P15 in the communication system 300.

FIG. 4 is a flowchart of the operation of the estimation apparatus 100. Details of the operation of the estimation apparatus 100 will be described using FIG. 4. The acquirer 110 acquires the information indicating the candidate positions and the communication information (step S101). In the present embodiment, as one example, the communicator 111 acquires the communication information, and the input device 112 acquires the information indicating the candidate positions. The propagation information included in the communication information is the RSSI. The respective kinds of acquired information are sent to the controller 121 and held in the storage 130. The controller 121 sends the information indicating the candidate positions to the determiner 122. FIG. 5 is a diagram illustrating the candidate positions of the communication system 300 and the wireless devices 200 as an example of the present embodiment. The communication system 300 has candidate positions P1-P15 as the candidate positions included in the information indicating the candidate positions, and has wireless devices 200D1-200D15 as the wireless devices 200. For the candidate positions P1-P15, the respective positions (coordinates) are distinct. For example, in FIG. 5, each of the candidate positions P1-P15 is specified by an x coordinate and a y coordinate. The candidate position P1 is indicated as (x,y)=(1,3), the candidate position P2 is indicated as (x,y)=(1,2), the candidate position P3 is indicated as (x,y)=(2,1), . . . , and the candidate position P15 is indicated as (x,y)=(10,1). The estimation apparatus 100 recognizes that the wireless devices 200 are the wireless devices 200D1-200D15 by the identification information of the wireless devices 200 included in the acquired communication information, but does not know at which candidate positions of the candidate positions P1-P15 they are positioned.

Figure 6:
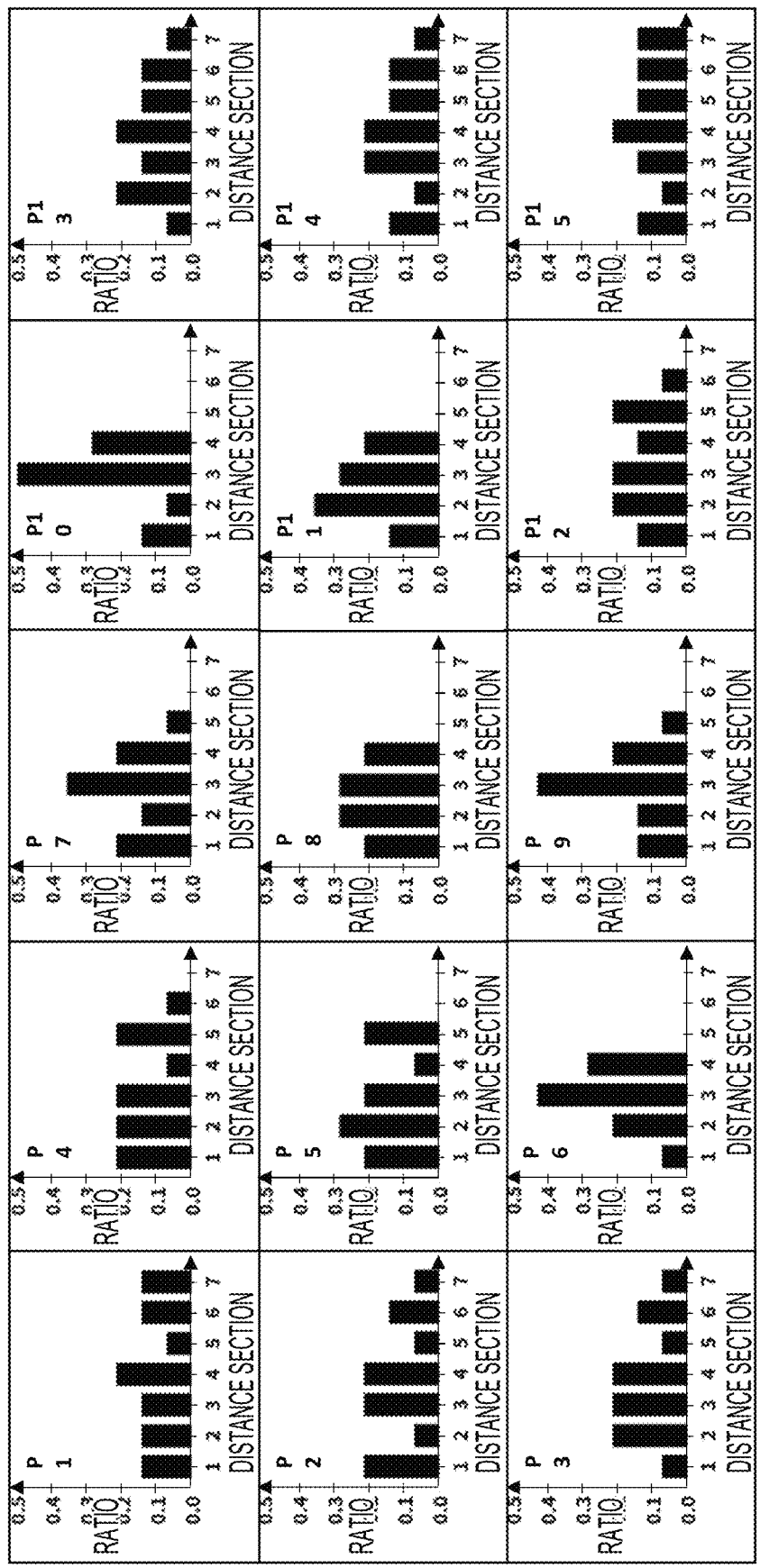
FIG. 6 is a diagram illustrating a distance to other candidate positions at each candidate position.

The determiner 122 generates the information regarding the distances among the plurality of candidate positions used for determining the candidate positions A to acquire the identification information of the located wireless devices 200, based on the information indicating the candidate positions, which is sent from the controller 121 (step S102). In the present embodiment, by paying attention to a certain candidate position and calculating distances from the candidate position under attention to the other candidate positions for all the candidate positions, the information regarding the distances among the plurality of candidate positions is generated. For example, the determiner 122 calculates the distances from the candidate position P1 to the candidate positions P2-P15, calculates the distances from the candidate position P2 to the candidate positions P1 and P3-P15, . . . and calculates the distances from the candidate position P15 to the candidate positions P1-P14. FIG. 6 is a diagram illustrating the distances to the other candidate positions (14 pieces) at each candidate position in classifications of seven sections. For the sections of the distances (hereinafter, also referred to as distance sections), the distance between the candidate positions becomes long as the number becomes large. Hereinafter, the respective distance sections illustrated in FIG. 6 are also referred to as a distance section 1, a distance section 2, . . . , a distance section 7. For example, when paying attention to the candidate positions P1-P3 and P13-P15, the other candidate positions exist in the respective distance sections 1-7. It is because the distance from the candidate position at one end to the candidate position at the other end becomes long since the candidate positions P1-P3 and P13-P15 are the candidate positions at the left and right ends, as illustrated in FIG. 5. On the other hand, for the candidate positions P6-P8 and P10-P11 or the like, the other candidate positions do not exist in the distance sections 5-7. It is because there are few candidate positions at a long distance since the candidate positions P6-P8 and P10-P11 are the candidate positions near the center, as illustrated in FIG. 5.

The determiner 122 determines the candidate positions A to acquire the identification information of the located wireless devices 200 based on the generated information relating to the distances among the plurality of candidate positions (step S103). In the present embodiment, as one example, the determiner 122 evaluates ratios of the other candidate positions in the distance sections for the respective candidate positions P1-P15, and determines the candidate positions at the long distance from the other candidate positions as the candidate positions A. The determiner 122 may determine all the candidate positions which satisfy a predetermined reference as the candidate positions A, or may determine a predetermined number of pieces from a higher rank evaluated as being at the long distance from the other candidate positions as the candidate positions A. In the present embodiment, as one example, the candidate positions P1, P3, P13 and P15 are determined as the candidate positions A. The determiner 122 sends the information of the candidate positions A to the output device 140. The determiner 122 may send the information indicating the candidate positions together to the output device 140.

Figure 7:
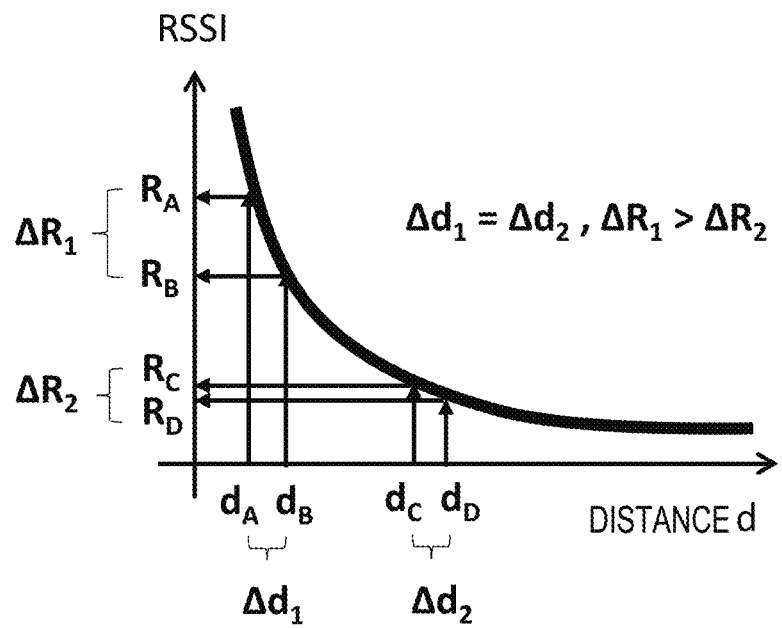
FIG. 7 is a diagram illustrating a relation between an RSSI and the distance.

For the candidate positions A, the possibility that the estimation of the wireless devices 200 set at the candidate positions A becomes erroneous is high compared to the other candidate positions since the distance from the other candidate positions is long (that is, the estimation accuracy is low). The reason will be described using FIG. 7. FIG. 7 is a diagram illustrating a relation between the RSSI and a distance d. The RSSI among the plurality of wireless devices 200 attenuates in proportion to a power of the distance. For example, in a free space, the RSSI attenuates in proportion to a square of the distance. Even when a difference of the distance is the same, the difference of the RSSI corresponding to the difference of the distance is not fixed. In FIG. 7, one wireless device which broadcasts signals among the wireless devices 200 and the RSSI according to the distance from the wireless device are illustrated. It is $R_A$ at a distance $d_A$, $R_B$ at a distance $d_B$, $R_C$ at a distance $d_C$ and $R_D$ at a distance $d_D$. A difference $\Delta d_1$ from the distance $d_A$ to the distance $d_B$ and a difference $\Delta d_2$ from the distance $d_C$ to the distance $d_D$ are equal. However, between a difference $\Delta R_1$ of $R_A$ and $R_B$ and a difference $\Delta R_2$ of $R_C$ and $R_D$, $\Delta R_2$ is smaller than $\Delta R_1$. In such a manner, the change of the measured RSSI becomes small as separating from the wireless device which broadcasts the signals.

On the other hand, fluctuation due to a factor other than the distance is generated in the RSSI. For example, it is the fluctuation by multipath fading. In the fluctuation, a length of the distance does not give influence as much as attenuation of the RSSI. Since the RSSI attenuates in proportion to the power of the distance, the influence of the fluctuation due to the factor other than the distance on the RSSI increases as the distance increases. Accordingly, for the candidate positions at corners of the communication system 300 or at the ends of a long side or the like, the estimation accuracy of the located wireless devices 200 becomes low. In FIG. 5, the estimation accuracy is low for the candidate positions P1, P3 P13 and P15 or the like compared to the other candidate positions.

Figure 8:
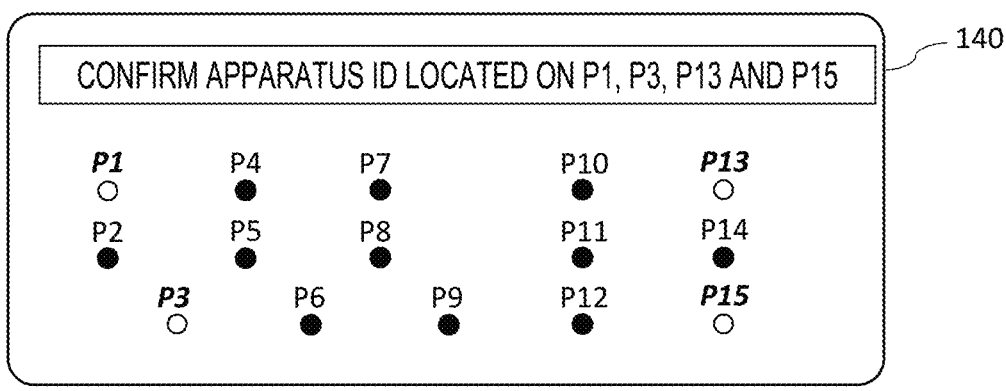
FIG. 8 is a diagram visually illustrating candidate positions A and an instruction to input identification information of wireless devices 200A in the first embodiment.

The output device 140 outputs the information of the candidate positions A and the instruction to input or send the identification information of the wireless devices 200A located on the candidate positions A (step S104). In the present embodiment, as one example, the output device 140 includes a device which receives the information indicating the candidate positions and the information of the candidate positions A from the determiner 122 and visually displays the candidate positions A and the instruction to input the identification information of the wireless devices 200A located on the candidate positions A. FIG. 8 is the candidate positions A and the instruction to input the identification information of the wireless devices 200A visually indicated by the output device 140, as an example of the present embodiment. Together with a positional relation of the candidate positions P1-P15, the instruction to input apparatus IDs for example as the identification information of the wireless devices 200 located on the candidate positions P1, P3, P13 and P15 which are the candidate positions A is displayed.

The input device 112 acquires the identification information of the wireless devices 200A located on the candidate positions A inputted according to the instruction of the output device 140 (step S105). In the present embodiment, as one example, by the user inputting the apparatus IDs of the wireless devices 200A, the input device 112 acquires the identification information of the wireless devices 200A. The input device 112 sends the identification information of the wireless devices 200A to the storage 130 via the controller 121.

Figure 9:
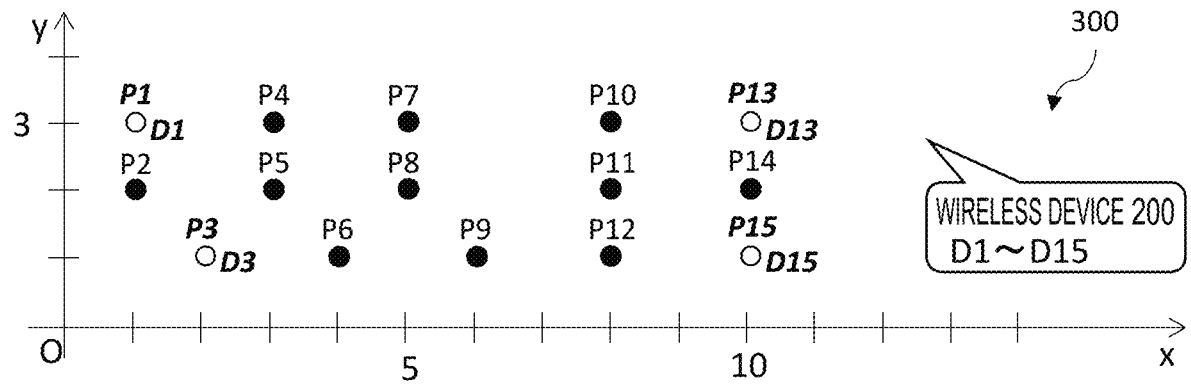
FIG. 9 is a diagram describing the communication system 300 after the identification information of the wireless devices 200A is acquired in the first embodiment.

FIG. 9 is the location situation of the wireless devices 200D1-D15 recognized by the estimation apparatus 100 at the end of step S105. Since the identification information of the wireless devices 200A located on the candidate positions A is acquired, the estimation apparatus 100 recognizes that the wireless device 200D1 is located on the candidate position P1, the wireless device 200D3 is located on the candidate position P3, the wireless device 200D13 is located on the candidate position P13, and the wireless device 200D15 is located on the candidate position P15. The estimation apparatus 100 does not know which wireless devices 200 are located on the candidate positions P2, P4-P12 and P14.

The estimator 123 estimates the positions of the respective wireless devices 200 from the candidate positions included in the information indicating the candidate positions, based on the identification information of the wireless devices 200A, the information indicating the candidate positions and the communication information (step S106). The identification information of the wireless devices 200A, the information indicating the candidate positions and the communication information are sent from the controller 121 to the estimator 123. Here, the estimator 123 recognizes that some of the wireless devices 200 are the known wireless devices 200A from the identification information of the wireless devices 200A located on the candidate positions A, however, even when the known wireless devices 200 are included, it is referred to as the estimation of the positions of the wireless devices 200. It is assumed that the estimator 123 estimates the positions of the respective wireless devices 200 even in the case of estimating the positions of the wireless devices 200 other than the known wireless devices 200A. In FIG. 9, the estimator 123 estimates the positions of the unknown wireless devices 200D2, D4-D12 and D14 from the candidate positions P2, P4-P12 and P14, and it is assumed that the positions of the respective wireless devices 200 are estimated. Hereinafter, an estimation method of the estimator 123 will be described.

The estimator 123 generates a plurality of combinations (hereinafter, also referred to as hypotheses) in which the wireless devices 200D2, D4-D12 and D14 are temporarily arranged at the candidate positions P2, P4-P12 and P14. Since it is known that the wireless device 200D1 is positioned at the candidate position P1, the wireless device 200D3 is positioned at the candidate position P3, the wireless device 200D13 s positioned at the candidate position P13 and the wireless device 200D15 is positioned at the candidate position P15 respectively, they are fixed in any hypotheses. The estimator 123 calculates the evaluation value for each hypothesis, and estimates the combination most appropriate as the arrangement of the wireless devices 200D1-D12 as the positions of the respective wireless devices 200. Examples of an evaluation index to be an index of the evaluation value in the hypotheses will be described below. The estimator 123 can use Pearson's correlation coefficient and Spearman's rank correlation coefficient as the evaluation index. They use a correlation between the distances of the respective wireless devices 200D1-D15 and the RSSI for each hypothesis. Since the RSSI between the two wireless devices 200 is strongly correlated with the distance, it is assumed that the distance between the two wireless devices 200 is shorter when the RSSI is larger. Then, the estimator 123 evaluates if the RSSI of the propagation information is larger when the distances of the respective wireless devices 200D1-D15 in the hypothesis are shorter. For example, the estimator 123 estimates the combination in which the correlation between the distances of the respective wireless devices 200D1-D15 in the hypothesis and the RSSI of the propagation information is closest to −1 as the positions of the respective wireless devices 200. In addition, as an example of the evaluation index, the estimator 123 may obtain likelihood of Rayleigh distribution. For that, the distances of the wireless devices 200D1-D15 are obtained for each hypothesis, and average reception power for each distance is obtained. In the case of using the likelihood of the Rayleigh distribution, the propagation information includes information regarding reception power among the wireless devices 200. The estimator 123 defines the obtained average reception power as a parameter, and uses the Rayleigh distribution to obtain a calculation value of the RSSI. The estimator 123 compares the calculation value of the RSSI and the RSSI among the wireless devices 200 measured as the propagation information, and obtains the likelihood. The estimator 123 estimates the combination in which the likelihood is maximum as the positions of the respective wireless devices 200. The estimator 123 may evaluate all the hypotheses (entire combination search), or may omit some hypotheses by using genetic algorithm or the like.

Figure 10:
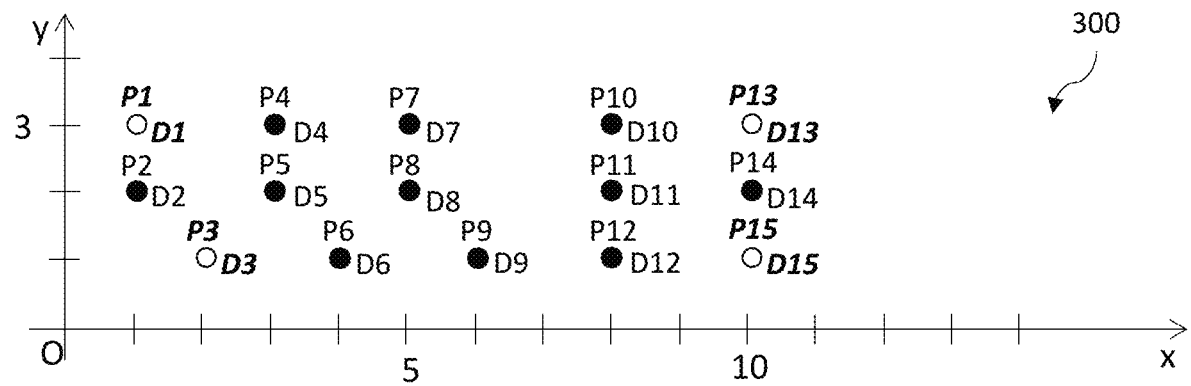
FIG. 10 is a diagram describing positions of respective wireless devices 200 estimated in the first embodiment.

FIG. 10 is the positions of the respective wireless devices 200 estimated by the estimator 123 as an example of the present embodiment. The estimator 123 estimates that the wireless device 200D1 is positioned at the candidate position P1, the wireless device 200D2 is positioned at the candidate position P2, . . . , and the wireless device 200D15 is positioned at the candidate position P15. The estimator 123 sends the information including the estimated positions of the respective wireless devices 200 to the controller 121 and the output device 140. The controller 121 may make the storage 130 hold the sent information of the positions of the respective wireless devices 200.

The output device 140 outputs the information including the positions of the respective wireless devices 200, which is sent from the estimator 123 (step S107). While the output destination and the output form are arbitrary, in the present embodiment, as one example, the information is outputted to the output device (the device illustrated in FIG. 8) which can be recognized by a user of the estimation apparatus 100 and to which the user can input the response to the information including the positions of the respective wireless devices 200.

The acquirer 110 acquires the response from the user to the information including the positions of the respective wireless devices 200 (step S108). While the content and form of the response are arbitrary, in the present embodiment, as one example, it is assumed that the user inputs that the outputted positions of the respective wireless devices 200 are correct as the response. In the case where the outputted positions of the respective wireless devices 200 are partially erroneous, the user may input the correct positions of the wireless devices 200 as the response. The acquirer 110 (the input device 112 in this case) acquires the response to the positions of the respective wireless devices 200 from the user. The acquirer 110 sends the information indicating the acquired response to the controller 121.

The controller 121 determines the positions of the respective wireless devices 200 based on the information including the positions of the respective wireless devices 200, which is sent from the estimator 123, and the information indicating the response, which is sent from the acquirer 110, and attains the determined information (step S109). For example, in the case where the response indicates that the positions of the respective wireless devices 200 are correct, the controller 121 determines the positions of the respective wireless devices 200, which are sent from the estimator 123, as being correct, and makes the storage 130 hold them as the determined information. In the case where the storage 130 is made to hold the information of the positions of the respective wireless devices 200, the controller 121 may determine them according to the response. In the case where the response indicates that the positions of the respective wireless devices 200 are to be at least partially corrected, the controller 121 corrects and determines the positions of the respective wireless devices 200, which are sent from the estimator 123, and makes the storage 130 hold them as the determined information. The controller 121 may make the output device 140 output the determined information according to the instruction to output the determined information acquired by the acquirer 110.

The controller 121 confirms whether or not an end command to end the operation of the estimation apparatus 100 has arrived (step S110). The end command is a command which ends the operation of the estimation apparatus 100 by the present flow. The end command is communicated to the controller 121 by input to the input device 112 by the user or acquisition of the signals including the end command by the communicator 111 or the like. The end command may be a command which immediately ends the operation of the estimation apparatus 100.

In the case where the end command has not arrived at the controller 121 (step S110: No), the flow returns to step S101. On the other hand, in the case where the end command has arrived at the controller 121 (step S110: Yes), the flow is ended and the estimation apparatus 100 ends the operation.

The estimation apparatus 100 of the present embodiment has been described above. The estimation apparatus 100 described in the present embodiment is an example, and the modifications can be variously implemented and executed. The modifications of the present embodiment will be described below.

Modification 1

Hereinafter, the modification of the operation in the estimation apparatus 100 of the present embodiment will be described. For step S101, the communication information is acquired in the present embodiment, however, it may be acquired in another step. The communication information should be acquired before the estimation of the positions of the wireless devices 200 in step S106.

For step S103, the number of the candidate positions determined as the candidate positions A is four in the present embodiment, however, the number may be determined in consideration of the number of coordinate axes and symmetry of the candidate positions. For example, in the case where coordinates are three-dimensional (x,y,z), by turning the candidate positions for the number of the coordinate axes to the candidate positions A, the case where the candidate positions are rotated for any coordinate axis can be eliminated. In addition, in the case where some candidate positions are regularly arranged, some candidate positions are symmetrical in some cases. For example, they become point symmetrical in some cases. In FIG. 10, in the case where the candidate positions A and the wireless devices 200A are not determined, it is also conceivable to estimate that the wireless device 200D15 is located on the candidate position P1, the wireless device 200D14 is located on the candidate position P2, the wireless device 200D2 is located on the candidate position P14 and the wireless device 200D1 is located on the candidate position P15. Then, in the case where some candidate positions are regularly arranged, by determining at least one of the point symmetrical candidate positions to be included in the candidate positions A, the determiner 122 can perform the estimation excluding the symmetry for some candidate positions.

For step S104, the instruction to input the identification information of the wireless devices 200A located on the candidate positions A, the candidate positions A and the other candidate positions are visually displayed together as described in FIG. 8 in the present embodiment, however, various output methods are conceivable. For example, the output device 140 may display the coordinates of the candidate positions A together, may display position information of the user or the estimation apparatus 100 together, or may combine and output characters, diagrams, sound, vibrations and the like. In addition, the instruction to input the identification information of the wireless devices 200A and the information of the candidate positions A may be outputted by the signals, or may be notified to a communication device of a transmission destination by sound or vibrations or the like. The output methods described above are applicable also at the time of the output in step S107.

For step S109, in the present embodiment, in the case where the positions of the respective wireless devices 200 are corrected, the corrected positions of the respective wireless devices 200 are turned to the determined information. In the modification, the positions of the respective wireless devices 200 may be estimated (step S106) again based on the corrected positions of the respective wireless devices 200. At the time, the positions of the wireless devices 200 that are not corrected are handled as being determined.

Modification 2

In the present embodiment, the positions are estimated respectively for all the wireless devices 200, however, the estimator 123 may determine the positions of some wireless devices 200 using the determined information. For example, in the case where some of the wireless devices 200D1-D15 are replaced, the positions of the replaced wireless devices 200 need to be estimated, however, a calculation amount can be reduced using the determined information when the non-replaced wireless devices 200 are already estimated.

Figure 11:
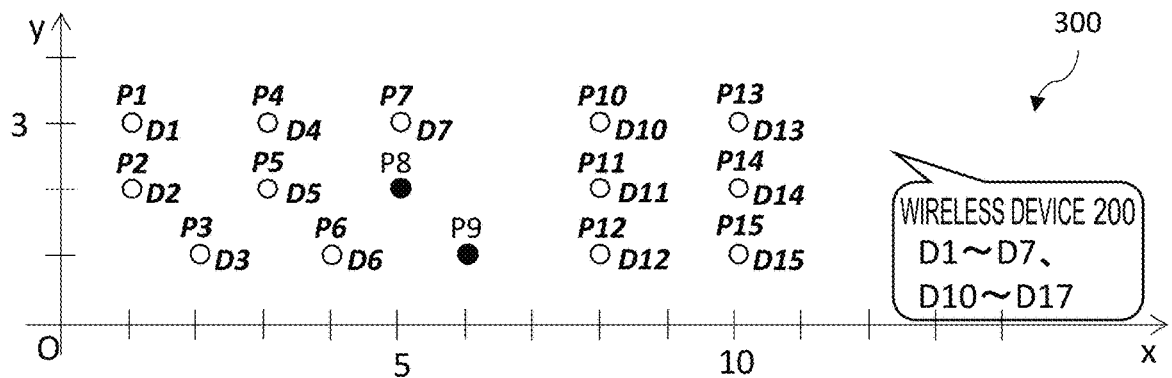
FIG. 11 is a diagram describing the communication system 300 in a case where some of the wireless devices 200 are replaced in a modification of the first embodiment.
Figure 12:
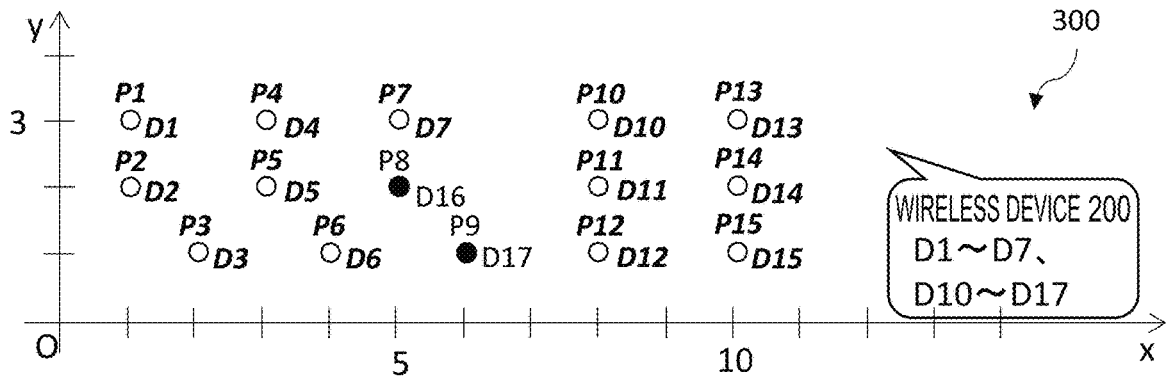
FIG. 12 is a diagram describing the positions of the respective wireless devices 200 estimated in the modification of the first embodiment.

FIG. 11 is a diagram illustrating the communication system 300 in which the wireless devices 200D8 and D9 of the wireless devices 200D1-D15 are replaced with wireless devices 200D16 and D17. By acquiring the communication information, the estimation apparatus 100 recognizes that the wireless devices 200D8 and D9 are out of the communication system 300 and the wireless devices 200D16 and D17 have joined the communication system 300. The estimation apparatus 100 recognizes the positions of the wireless devices 200D1-D7 and D10-D15 from the determined information. In this case, the estimation apparatus 100 may estimate the positions of the wireless devices 200D16 and D17 which are some of the wireless devices 200. Since the estimation method is similar to that in the present embodiment, the description is omitted. FIG. is the positions of the respective wireless devices 200 estimated by the estimator 123 as an example of the present embodiment. The estimation apparatus 100 estimates that the wireless device 200D16 is located on the candidate position P8 and the wireless device 200D17 is located on the candidate position P9. While two wireless devices 200 are replaced in the present modification, one wireless device 200 may be replaced and the present modification is similarly applicable even when three or more wireless devices 200 are replaced.

Modification 3

Hereinafter, the modification of various kinds of information used by the estimation apparatus 100 will be described. While the RSSI is used as the propagation information in the present embodiment, a feature amount of the propagation information may be used. For example, an average value, a maximum value and a standard deviation of the RSSI or the average value, the minimum value and the standard deviation of propagation time may be used. By using the feature amount of the propagation information, a data amount of the propagation information can be reduced. The feature amount of the propagation information may be extracted by the respective wireless devices 200. By transmitting the feature amount of the propagation information extracted by the wireless devices 200 to the estimation apparatus 100, an information amount and the time of communication with the wireless devices 200 by the estimation apparatus 100 can be reduced.

Modification 4

Hereinafter, the modification of the communication system 300 of the present embodiment will be described. While the description is given by allocating the same number to the wireless devices 200 in the present embodiment, all the wireless devices 200D1-D15 do not need to be the same wireless devices. Arbitrary wireless devices are applicable as long as the communication between the estimation apparatus 100 and the wireless device 200 and the communication among the plurality of wireless devices 200 are possible and the propagation information can be measured.

While the estimation apparatus 100 and the wireless devices 200 are indicated as different devices in the present embodiment, one of the wireless devices 200 may also serve as the estimation apparatus 100. Even in this case, the estimation operation described in the present embodiment is possible.

While the number of the candidate positions and the number of the wireless devices 200 are identical in the present embodiment, they do not always need to be identical. For example, even in the case where the number of the candidate positions is larger than the number of the wireless devices 200 and the wireless device 200 does not exist at some candidate positions, the positions of the respective wireless devices 200 can be estimated from the candidate positions by the method described in the present embodiment.

While the candidate positions P1-P15 are partially regular (grid-like) positions (coordinates) in the present embodiment, they do not always need to be regular. The positions (coordinates) of the candidate positions may be at least partially random.

Modification 5

Hereinafter, the modification which achieves functions of the estimation apparatus 100 by a program will be described. The functions performed by the components of the estimation apparatus 100 may be achieved by a processor similar to the processor 120 processing the program. The program may be provided by being stored in a computer-readable storage medium such as a CD-ROM, a memory card, a CD-R or a DVD (Digital Versatile Disk) in a file of an installable form or an executable form. Further, the program may be stored on a computer connected to a network such as the Internet and provided via the network, or provided by being incorporated in the storage medium such as a ROM, an HDD or an SSD.

The modifications of the estimation apparatus 100 have been described above. The estimation apparatus 100 of the present embodiment determines the candidate positions A to acquire the identification information of the located wireless devices 200 according to the information regarding the distances among the candidate positions. The estimation apparatus 100 acquires the identification information of the wireless devices 200A located on the candidate positions A. Accordingly, the estimation apparatus 100 can estimate the located wireless devices 200 for the candidate positions where the possibility that the estimation of the located wireless devices 200 becomes erroneous is low, and can improve the estimation accuracy. Further, compared to the case of performing the estimation for all the wireless devices 200, the calculation amount required for the estimation can be reduced.

Second Embodiment

The second embodiment will be described. Since the communication system 300 including the estimation apparatus 100, the wireless devices 200D1-D15 and the candidate positions P1-P15 in the second embodiment is similar to that in the first embodiment, the description is omitted. In the present embodiment, the estimation apparatus 100 estimates the positions of the wireless devices 200 based on the information indicating the candidate positions and the communication information for each of the plurality of evaluation indexes. The estimation apparatus 100 determines a position b for which the different wireless devices 200 are estimated depending on the evaluation indexes from the candidate positions. The estimation apparatus 100 outputs an instruction to acquire the identification information of a wireless device 200b located on the position b, and acquires the identification information of the wireless device 200b. Thus, the estimation apparatus 100 can improve the estimation accuracy of the positions of the wireless devices 200.

Figure 13:
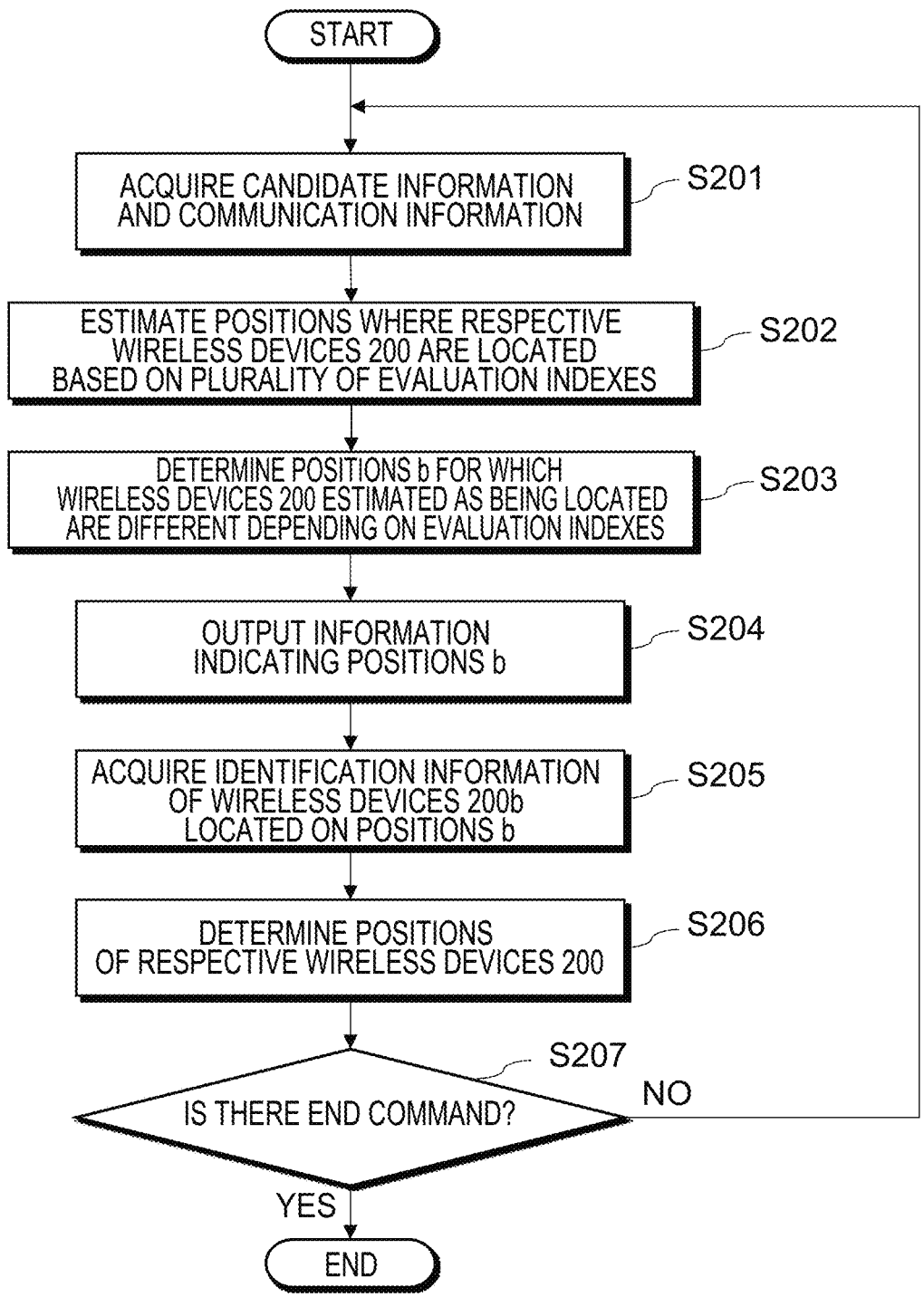
FIG. 13 is a flowchart of the operation of the estimation apparatus 100 in a second embodiment.

FIG. 13 is a flowchart of the operation of the estimation apparatus 100 in the present embodiment. Details of the operation of the estimation apparatus 100 will be described using FIG. 13. In the present embodiment, as one example, the operation in the case where the estimation apparatus 100 estimates the positions of the respective wireless devices 200 will be described. Among the individual steps, some description is omitted and differences will be described for the steps similar to that in the first embodiment in some cases.

Step S201 is similar to step S101. The controller 121 sends the information indicating the candidate positions and the communication information received from the acquirer 110 to the estimator 123. The estimator 123 estimates the positions of the respective wireless devices 200 for each of the plurality of evaluation indexes from the candidate positions included in the information indicating the candidate positions, based on the information indicating the candidate positions and the communication information (step S202). For the method by which the estimator 123 estimates the positions of the respective wireless devices 200, the method similar to that in the first embodiment is applied. As an example of the present embodiment, the estimator 123 uses three evaluation indexes that are the Pearson's correlation coefficient (an evaluation index A), the Spearman's rank correlation coefficient (an evaluation index B) and maximum likelihood estimation (an evaluation index C) utilizing the Rayleigh distribution. The estimator 123 estimates the positions of the respective wireless devices 200 from the candidate positions included in the information indicating the candidate positions for each of the three evaluation indexes. FIG. 14 is an estimated result of the positions of the respective wireless devices 200 in each evaluation index as an example of the present embodiment. In FIG. 14, there are wireless devices 200a estimated as being located on common positions (also referred to as positions "a") by the evaluation indexes A, B and C, and the wireless devices 200b estimated as being located on different positions (also referred to as positions b) by the evaluation indexes A, B and C. The wireless devices 200a are the wireless devices 200D3-D12 and D15, and the wireless devices 200b are the wireless devices 200D1-D2 and D13-D14. The estimator 123 sends information indicating the estimated result of the positions of the respective wireless devices 200 in each evaluation index to the controller 121 and the determiner 122.

Figure 15A:
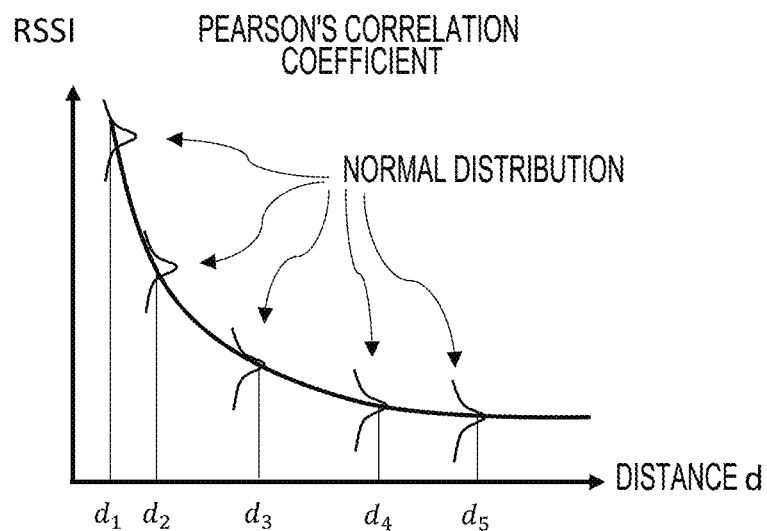
FIGS. 15A, 15B and 15C are diagrams describing the evaluation indexes in the second embodiment.
Figure 15B:
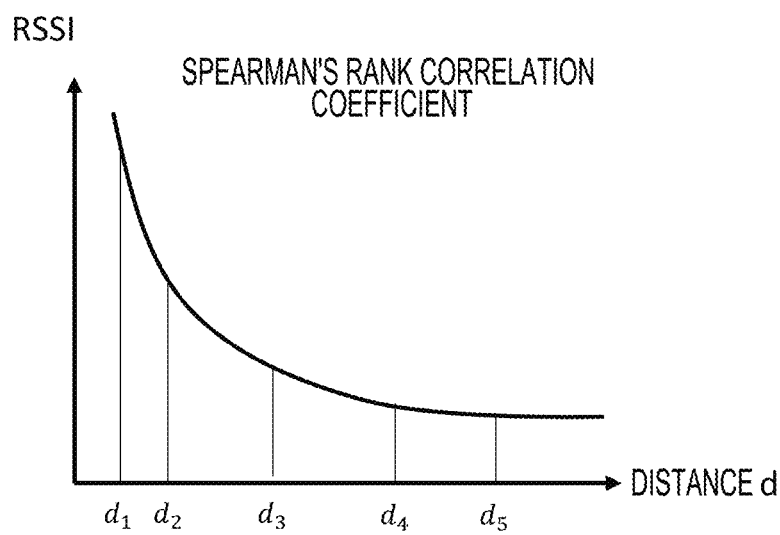
Figure 15C:
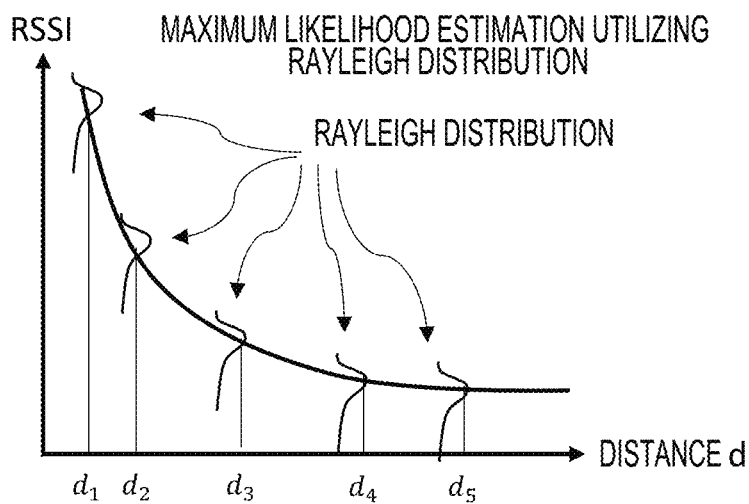

Hereinafter, a reason why there is the case where the estimated result of the positions of the respective wireless devices 200 is different depending on the evaluation indexes will be described. FIG. 15 are diagrams illustrating a relation between the distance d in the Pearson's correlation coefficient (FIG. 15A), the Spearman's correlation coefficient (FIG. 15B) and the maximum likelihood estimation (FIG. 15C) utilizing the Rayleigh distribution and the RSSI in the respective evaluation indexes. The estimator 123 can create a graph of the RSSI for each evaluation index according to the distance d among the wireless devices 200. In the Pearson's correlation coefficient, it is a premise that the RSSI follows a normal distribution at the same distance d. In FIG. 15A, as one example, the normal distributions of the RSSI at respective distances $d_1$-$d_5$ are illustrated by broken lines. In the Pearson's correlation coefficient, the graph (a solid line in FIG. 15A) of the RSSI taking the normal distribution of the RSSI at each distance into consideration is attained. In the Spearman's rank correlation coefficient, the graph (the solid line in FIG. 15B) of the RSSI on the premise that the RSSI is uniquely determined at the same distance is attained. In the maximum likelihood estimation utilizing the Rayleigh distribution, it is the premise that the RSSI follows the Rayleigh distribution at the same distance d. In FIG. 15C, as one example, the Rayleigh distributions of the RSSI at the respective distances $d_1$-$d_5$ are illustrated by the broken lines. In the maximum likelihood estimation utilizing the Rayleigh distribution, the graph (the solid line in FIG. 15C) of the RSSI taking the Rayleigh distribution of the RSSI at each distance into consideration is attained. From the above, since the graph of the RSSI to be compared with a measurement value of the RSSI which is the propagation information is different depending on the evaluation indexes, there is the case where the estimated result of the positions of the respective wireless devices 200 is different depending on the evaluation indexes. Note that, even when the evaluation indexes are different, a point that the RSSI attenuates according to the power of the distance is in common.

Returning to the flowchart in FIG. 13, the determiner 122 determines the positions b, based on the information indicating the estimated result of the positions of the respective wireless devices 200 in each evaluation index (step S203). The positions b are the positions for which the wireless devices 200 estimated as being located are different depending on the evaluation indexes. In the present embodiment, the positions b are the candidate positions P1, P2, P13 and P14.

The output device 140 outputs the instruction to input or send the information of the positions b and the identification information of the wireless devices 200b located on the positions b (step S204). In the present embodiment, as one example, similarly to step S104, the output device 140 receives the information indicating the candidate positions and the information of the positions b from the determiner 122, and visually displays the positions b and the instruction to input the identification information of the wireless devices 200b.

The input device 112 acquires the identification information of the wireless devices 200b located on the positions b, which is inputted according to the instruction (step S205). In the present embodiment, as one example, similarly to step S105, the input device 112 acquires the identification information of the wireless devices 200b by the user inputting the apparatus IDs of the wireless devices 200b to the output device 140 where the positions b and the instruction to input the identification information of the wireless devices 200b are visually displayed. Thus, the input device 112 acquires the information that the wireless device 200D1 is located on the candidate position P1, the wireless device 200D2 is located on the candidate position P2, the wireless device 200D13 is located on the candidate position P13 and the wireless device 200D14 is located on the candidate position P14.

The controller 121 determines the positions of the respective wireless devices 200 based on the information indicating the estimated result of the positions of the respective wireless devices 200 in each evaluation index, which is sent from the estimator 123, and the identification information of the wireless devices 200b sent from the acquirer 110, and attains the determined information (step S206). The controller 121 defines the positions of the wireless devices 200 for which the estimated result matches among the different evaluation indexes and the positions of the wireless devices 200b corrected by the identification information of the wireless devices 200b as the determined information altogether. In the present embodiment, in addition to that the positions of the wireless devices 200D3-D12 and D15 are the candidate positions P3-P12 and P15 respectively, the positions of the wireless devices 200D1-D2 and D13-D14 are corrected to the candidate positions P1-P2 and P13-P14 respectively by the identification information of the wireless devices 200b, and the determined information is attained. The controller 121 makes the storage 130 hold the determined information. The controller 121 may make the output device 140 output the determined information according to the instruction to output the determined information acquired by the acquirer 110. Step S207 is similar to step S110.

The estimation apparatus 100 of the present embodiment has been described above. The estimation apparatus 100 described in the present embodiment is an example, and the modifications can be variously implemented and executed. For example, the first embodiment and the modifications can be applied in a range without discrepancy.

The estimation apparatus 100 estimates the positions of the wireless devices 200 based on the information indicating the candidate positions and the communication information for each of the plurality of evaluation indexes. The estimation apparatus 100 determines the positions b for which the different wireless devices 200 are estimated depending on the evaluation indexes from the candidate positions. The estimation apparatus 100 outputs the instruction to acquire the identification information of the wireless devices 200b located on the positions b, and acquires the identification information of the wireless devices 200b. Accordingly, the identification information of the located wireless devices 200 can be acquired for the positions b where the possibility that the estimation of the located wireless devices 200 becomes erroneous is high, and the estimation accuracy can be improved. Further, compared to the case of performing the estimation for all the wireless devices 200, the calculation amount required for the estimation can be reduced.

According to at least one embodiment described above, the estimation accuracy of the estimation apparatus 100 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
processing circuitry configured to:
acquire first information regarding distances among a plurality of candidate positions of a plurality of wireless devices, second information regarding communication among the plurality of wireless devices, and first identification information corresponding to each of the plurality of wireless devices, wherein each of the plurality of wireless devices is located at one of the plurality of candidate positions; and
determine a first candidate position from among the plurality of candidate positions based on the first information, the first candidate position being determined by (i) calculating, for each of the plurality of candidate positions, distances between the candidate position and each remaining one of the plurality of candidate positions, and (ii) selecting, as the first candidate position, a candidate position from among two of the plurality of candidate positions having a longest calculated distance therebetween;
output circuitry configured to output information indicating the first candidate position; and
acquisition circuitry configured to acquire second identification information, the second identification information being the first identification information corresponding to a wireless device from among the plurality of wireless devices located at the first candidate position,
wherein the processing circuitry is configured to estimate a correspondence between (i) a candidate position other than the first candidate position from among the plurality of candidate positions and (ii) identification information at the candidate position, the identification information being the first identification information other than the second identification information, and the correspondence being estimated based on the first information, the second identification information, and the second information.

2. The electronic apparatus according to claim 1, wherein:
the output circuitry outputs information indicating the correspondence,
the acquisition circuitry acquires a first response to the information indicating the correspondence, and
the processing circuitry is configured to correct the correspondence.

3. The electronic apparatus according to claim 1, wherein:
the output circuitry outputs information indicating the correspondence,
the acquisition circuitry acquires a first response to the information indicating the correspondence, and
the processing circuitry estimates the correspondence based further on the first response.

4. The electronic apparatus according to claim 1, wherein the second information includes information indicating at least one of an RSSI (Received Signal Strength Indicator), a PER (Packet Error Rate), or a propagation time of a radio wave.

5. The electronic apparatus according to claim 1, wherein the second information includes information indicating a propagation time of a radio wave, and a communication among the wireless devices is in compliance with UWB (Ultra Wide Band).

6. An electronic system comprising:
the electronic apparatus according to claim 1; and
the wireless devices.

7. An electronic apparatus comprising:
processing circuitry configured to:
estimate a correspondence between a candidate position included in a plurality of candidate positions and identification information of a wireless device at the candidate position, for a plurality of wireless devices each of which is located at one of the plurality of candidate positions, based on first information indicating the plurality of candidate positions, second information regarding communication among the plurality of wireless devices, and a first evaluation index which evaluates a correlation between a distance between the plurality of wireless devices and an RSSI (Received Signal Strength Indicator) of signals transmitted and received between the plurality of wireless devices;
estimate the correspondence based on the first information, the second information, and a second evaluation index which evaluates a correlation between a distance between the plurality of wireless devices and an RSSI of signals transmitted and received between the plurality of wireless devices, the second evaluation index being different from the first evaluation index; and determine a first position for which the estimated position of a first wireless device based on the first evaluation index is different from the estimated position of the first wireless device based on the second evaluation index, the first wireless device being one of the plurality of wireless devices;
output circuitry configured to output information indicating the first position; and
acquisition circuitry configured to acquire identification information of the first wireless device at the first position,
wherein the processing circuitry is configured to estimate the correspondence of wireless devices other than the first wireless device from among the plurality of wireless devices based on the acquired identification information.

8. The electronic apparatus according to claim 7, wherein:
the output circuitry outputs the correspondence estimated for the first position,
the acquisition circuitry acquires third information in response to the correspondence, and
the processing circuitry corrects the correspondence based on the third information.

9. The electronic apparatus according to claim 7, wherein:
the output circuitry outputs information indicating the correspondence estimated for the first position,
the acquisition circuitry acquires third information in response to the correspondence, and
the processing circuitry estimates the correspondence again based further on the third information.

10. A method comprising:
acquiring first information regarding distances among a plurality of candidate positions of a plurality of wireless devices;
acquiring second information regarding communication among the plurality of wireless devices, each of the plurality of wireless devices being located at one of the plurality of candidate positions;
acquiring first identification information corresponding to each of the plurality of wireless devices;
determining a first candidate position from among the plurality of candidate positions based on the first information, the first candidate position being determined by (i) calculating, for each of the plurality of candidate positions, distances between the candidate position and each remaining one of the plurality of candidate positions, and (ii) selecting, as the first candidate position, a candidate position from among two of the plurality of candidate positions having a longest calculated distance therebetween;
outputting information indicating the first candidate position;
acquiring second identification information, the second identification information being the first identification information corresponding to a wireless device from among the plurality of wireless devices located at the first candidate position; and
estimating a correspondence between (i) a candidate position other than the first candidate position from among the plurality of candidate positions and (ii) identification information at the candidate position, the identification information being the first identification information other than the second identification information, and the correspondence being estimated based on the first information, the second identification information, and the second information.

11. A method comprising:
estimating a correspondence between a candidate position included in a plurality of candidate positions and identification information of a wireless device at the candidate position, for a plurality of wireless devices each of which is located at one of the plurality of candidate positions, based on first information indicating the plurality of candidate positions, second information regarding communication among the plurality of wireless devices, and a first evaluation index which evaluates a correlation between a distance between the plurality of wireless devices and an RSSI (Received Signal Strength Indicator) of signals transmitted and received between the plurality of wireless devices;
estimating the correspondence based on the first information, the second information, and a second evaluation index which evaluates a correlation between a distance between the plurality of wireless devices and an RSSI of signals transmitted and received between the plurality of wireless devices, the second evaluation index being different from the first evaluation index; and
determining a first position for which the estimated position of a first wireless device based on the first evaluation index is different from the estimated position of the first wireless device based on the second evaluation index, the first wireless device being one of the plurality of wireless devices.

12. An electronic system comprising:
a plurality of wireless devices; and
processing circuitry configured to:
acquire first information regarding distances among a plurality of candidate positions of the plurality of wireless devices, second information regarding communication among the plurality of wireless devices, and first identification information corresponding to each of the plurality of wireless devices, wherein each of the plurality of wireless devices is located at one of the plurality of candidate positions; and
determine a first candidate position from among the plurality of candidate positions based on the first information, the first candidate position being determined by (i) calculating, for each of the plurality of candidate positions, distances between the candidate position and each remaining one of the plurality of candidate positions, and (ii) selecting, as the first candidate position, a candidate position from among two of the plurality of candidate positions having a longest calculated distance therebetween;
output circuitry configured to output information indicating the first candidate position; and
acquisition circuitry configured to acquire second identification information, the second identification information being the first identification information corresponding to a wireless device from among the plurality of wireless devices located at the first candidate position,
wherein the processing circuitry is configured to estimate a correspondence between (i) a candidate position other than the first candidate position from among the plurality of candidate positions and (ii) identification information at the candidate position, the identification information being the first identification information other than the second identification information, and the correspondence being estimated based on the first information, the second identification information, and the second information.

* * * * *